US006806815B1

United States Patent
Kaikuranta et al.

(10) Patent No.: US 6,806,815 B1
(45) Date of Patent: Oct. 19, 2004

(54) KEYPAD STRUCTURE WITH INVERTED DOMES

(75) Inventors: Terho Kaikuranta, Piispanristi (FI); Bror Svarfvar, Kaarina (FI)

(73) Assignee: Nokia Mobile Phones Ltd., Espoo (FI)

( * ) Notice: Subject to any disclaimer, the term of this patent is extended or adjusted under 35 U.S.C. 154(b) by 596 days.

(21) Appl. No.: 09/847,140

(22) Filed: May 2, 2001

(30) Foreign Application Priority Data

May 2, 2000 (FI) .............................................. 20001017

(51) Int. Cl.⁷ ........................ H03K 17/94; H03M 11/00
(52) U.S. Cl. ........................ 341/22; 341/31; 200/5 A; 200/310
(58) Field of Search .................... 341/31, 22; 200/5 A, 200/310, 512, 513

(56) References Cited

U.S. PATENT DOCUMENTS

| 3,777,222 A | 12/1973 | Harris |
| 3,928,741 A | 12/1975 | Comer |
| 4,307,268 A | 12/1981 | Harper |

(List continued on next page.)

FOREIGN PATENT DOCUMENTS

| EP | 0 503 197 | 9/1992 |
| EP | 0554084 A2 | 8/1993 |
| EP | 0899762 A1 | 3/1999 |
| EP | 1006543 A1 | 6/2000 |
| EP | 1006545 A1 | 6/2000 |
| JP | 4-68314 | 6/1992 |
| JP | 05-176044 | 7/1993 |
| JP | 06274261 | 9/1994 |
| JP | 7-32832 | 6/1995 |
| JP | 08-137487 | 5/1996 |
| JP | 08-146902 | 6/1996 |
| JP | 08-148056 | 6/1996 |
| JP | 08-265413 | 10/1996 |
| JP | 10-093675 | 4/1998 |
| JP | 11-088948 | 3/1999 |
| JP | 11-126047 | 5/1999 |
| JP | 11-191340 | 7/1999 |
| JP | 11-225198 | 8/1999 |
| JP | 11-327509 | 11/1999 |
| JP | 2000-075837 | 3/2000 |
| WO | WO 92/14345 | 8/1992 |

*Primary Examiner*—Timothy Edwards
(74) *Attorney, Agent, or Firm*—Perman & Green, LLP

(57) ABSTRACT

A keypad is disclosed for a portable electronic device. The keypad comprises an outer surface and a number of pressable keys (402). Associated with each key there is a pair of conductive contact points (501, 502, 611, 612, 620, 621, 622, 1106) separated from each other. A plurality of elastic domes (1103) is located next to the conductive contact points. For each pair of conductive contact points (501, 502, 611, 612, 620, 621, 622, 1106) there is an adjacent elastic dome (1103) having a concave side and a convex side, of which the concave side is at least partially conductive and directed towards the pair of conductive contact points. The concave sides of the plurality of elastic domes (1103) are directed towards the outer surface of the keypad.

13 Claims, 7 Drawing Sheets

U.S. PATENT DOCUMENTS

| | | |
|---|---|---|
| 4,343,975 A | 8/1982 | Sado |
| 4,439,646 A * | 3/1984 | Bouvrande .................. 200/5 A |
| 4,449,024 A | 5/1984 | Stracener .................... 200/317 |
| 4,646,062 A * | 2/1987 | Arakawa ..................... 341/31 |
| 4,683,360 A | 7/1987 | Maser |
| 5,304,764 A | 4/1994 | Kobayashi .................. 200/314 |
| 5,397,867 A | 3/1995 | Demeo ....................... 200/5 A |
| 5,477,430 A * | 12/1995 | LaRose ....................... 362/84 |
| 5,568,367 A * | 10/1996 | Park ............................ 362/109 |
| 5,570,114 A | 10/1996 | Fowler |
| 5,693,956 A | 12/1997 | Shi et al. |
| 5,721,542 A | 2/1998 | Shpater |
| 5,801,345 A | 9/1998 | Mikula-Curtis et al. |
| 5,818,361 A | 10/1998 | Acevedo |
| 5,847,336 A | 12/1998 | Thornton .................... 200/5 A |
| 5,914,676 A | 6/1999 | Akpa |
| 5,936,554 A | 8/1999 | Stanek |
| 5,945,929 A | 8/1999 | Westra |
| 5,960,942 A | 10/1999 | Thornton |
| 5,965,907 A | 10/1999 | Huang et al. |
| 5,971,557 A | 10/1999 | Kubes et al. |
| 6,028,591 A | 2/2000 | Lueders |
| 6,035,180 A | 3/2000 | Kubes et al. |
| 6,046,730 A | 4/2000 | Bowen et al. .............. 345/168 |
| 6,104,319 A | 8/2000 | Shpater |
| 6,217,183 B1 | 4/2001 | Shipman |
| 6,222,466 B1 | 4/2001 | Uggmark |
| 6,281,812 B1 | 8/2001 | Kim |
| 6,310,308 B1 | 10/2001 | Watson et al. |
| 6,412,953 B1 | 7/2002 | Tiao et al. |
| 6,439,731 B1 | 8/2002 | Johnson et al. |
| 6,538,371 B1 | 3/2003 | Duggal et al. |
| 2001/0035713 A1 * | 11/2001 | Kimura ....................... 313/501 |

* cited by examiner

KEYPAD STRUCTURE WITH INVERTED DOMES

CROSS REFERENCE TO RELATED APPLICATION

This application is related to co-pending U.S. patent application Ser. No. 09/847,142, filed on May 2, 2001.

TECHNOLOGICAL FIELD

The invention concerns generally the mechanical and electrical structure of a keypad or keyboard. Especially the invention concerns a keypad or keyboard where a layer of at least partially conductive domes is used to establish conductive connections in response to key presses.

BACKGROUND OF THE INVENTION

Membrane keypads appear typically in portable electronic apparatuses such as mobile telephones, palmtop computers and personal digital assistants. The term membrane keypad refers to an array of pressable keys where significant portions of the electromechanical structure consist of layers that extend essentially throughout the whole coverage area of the keypad. FIG. 1a is a partial cutout exploded view which illustrates a known structure for such a keypad. The upper surface of a printed circuit board 101 comprises a number of contact areas where at least two conductive strips 102 and 103 come close to each other. Supported over the printed circuit board 101 and separated from it by a perforated insulation layer 104 is an array of conductive domes 105 so that each conductive dome 105 lies directly above the conductive strips 102 and 103. A key mat 106 is located on top of the conductive domes. It is made of an elastic material and has a bulging protrusion 107 on top of each conductive dome. A perforated outer cover 108 comes on top of the aforementioned structural components so that each bulging protrusion 107 of the keymat protrudes slightly out through the holes in the outer cover.

The key mat 106 is made of translucent silicon rubber or some other suitable material that conducts light reasonably well so that a number of surface-mounted light emitting diodes (SM-LEDs) 109 can be used for illuminating. The SM-LEDs 109 are soldered to contact pads 110 and 111 so that in the assembled configuration their principal direction of emission is through an edge of the key mat 106 into the substance thereof. Light escaping through the upper surfaces of the bulging protrusions 107 provides the visual illuminating effect seen by the user. The upper surfaces of the bulging protrusions 107 may be partly covered with an opaque layer so that light can only escape through an opening which may have the outline of a character or a group of characters. FIG. 1b shows the same structure in assembled configuration.

FIG. 1c shows a simple circuit diagram of the illumination arrangement; the keypad functionality is not shown in FIG. 1c. The SM-LEDs 109 used for illumination constitute a serially coupled chain, the cathode side end of which is coupled to ground potential. The anode side end of the chain is coupled to a microprocessor 120 which comprises a controllable switch 121 between the anode side end of the SM-LED chain and a positive supply voltage Vcc. The microprocessor 120 comprises also means 122 for detecting the need for illumination of the keypad. The block 122 shown in FIG. 1c is typically a software process which is arranged to monitor the functional state of the keypad-controlled device in question and to generate an output pulse that closes the switch 121 whenever the functional state suggests that illumination of the keypad would be advantageous.

The illuminating arrangement of FIGS. 1a, 1b and 1c only enables the illumination of the whole keypad at a time. It would naturally be possible to group the SM-LEDs 109 into two or more subchains which could be coupled to a positive voltage independently of each other. However, even in such a further developed arrangement it is difficult to control the propagation of light in the substance of the key mat 106 so that only a part of the keypad would appear to be illuminated. Increasing the number of subchains would also directly increase the required I/O (input/output) pin count of the microprocessor 120, which is not a preferable trend in development. A further drawback of the arrangement of FIGS. 1a, 1b and 1c is that the SM-LEDs 109 take a certain space (in the order of 0.6 mm at minimum) in the vertical direction. Also other parts of the keypad arrangement have their respective non-zero thicknesses, so that altogether the illuminated keypad arrangement becomes rather thick.

SUMMARY OF THE INVENTION

It is an object of the present invention to provide a keypad arrangement the thickness of which is relatively small. It is an additional object of the invention to provide a thin illuminated keypad arrangement. It is a further object of the invention to provide a keypad illuminating arrangement which can be reconfigured for different kind of illumination effects with minimal effort.

The objects of the invention are achieved by inverting the domes in a keypad arrangement from their conventional upwards bulging orientation, so that the domes bulge towards the mechanical support structure of the keypad arrangement rather than towards the tactile surfaces of the keys. Certain other objects of the invention are achieved by using light sources made of layered foil structures, such as polymer based organic LEDs, for illuminating keys or key groups. Certain objects of the invention may even be achieved though other light sources, such as SM-LEDs, are used if the mechanical structure of the keypad is correctly designed.

The invention concerns a keypad for a portable electronic device. The characteristic features of a keypad according to the invention are recited in the independent patent claim directed to a keypad.

Conventionally it has been thought that the at least partially conductive domes that constitute the dome sheet or dome layer in a membrane keypad must bulge "upwards", that is, towards the outer surface at which the user sees and operates the keypad. In a conventional arrangement the action of pressing a key causes a point-like force to be exerted downwards against the center of a dome. According to the present invention it is perfectly possible and even advantageous to make the domes bulge downwards instead. Here "downwards" means the direction away from said surface at which the user sees and operates the keypad.

The invention does not place specific requirements to the light sources that are used to illuminate the keypad. There may even be no illumination at all. However, the mechanical structure according to the invention tends to make certain illumination arrangements more advantageous than others.

Organic LEDs, also known as OLEDs, are light-emitting semiconductor devices that consist of a stack of very thin material layers. A simple OLED structure consists of a transparent substrate, an anode electrode layer, a polymeric recombination layer and a cathode electrode layer on top of each other. In a keypad arrangement according to the invention, one or more OLEDs can be associated with individual keys or key groups so that they take on the role of the known surface-mounted diodes in illuminating the keypad. The OLEDs are integrated into the keypad structure so that one of the layers that would exist in the keypad structure also for other reasons also acts as the substrate layer for the OLEDs. An alternative solution is to manufacture complete OLEDs and to attach them to the other parts of the keypad arrangement for example by glueing or soldering them to a surface or embedding them into an injection moulded piece of material.

An OLED or comparable semiconductor light source used for keypad illumination can even be grouped together with a solid-state switching element such as an organic field-effect transistor, also known as OFET. The advantage gained through such grouping comes from the fact that a single pair of supply voltage lines can be used for a number of light sources, and still at least one of the light sources (the one grouped together with a switching element) can be individually switched on or off by using a simple, low-power control signal. A converter unit is typically required for converting the illumination controlling commands issued by a microprocessor into switching signals for the individual light source—switching element pairs.

An illuminated keypad according to the invention typically consists of layers so that a dome layer or dome sheet layer is not on top of the layer comprising the contact points but under it. Combining such an order of layers to the use of OLEDs as light sources for illumination results in a solution where the light sources may be located very close to the visible surface of the illuminated keys. The advantage gained therethrough comes from the fact that when the emitted light has only a very short passage to travel within a transparent or translucent substance before being emitted into air and towards the eyes of a user, only a fraction of that electric power must be used for illumination which was used to drive the light sources in conventional solutions, without compromising the observable intensity of light. A naturally occurring alternative viewpoint is that with the same amount of electric power used for illumination as in conventional solutions a far brighter lighting effect can be obtained.

BRIEF DESCRIPTION OF DRAWINGS

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE INVENTION

Figure 1A:
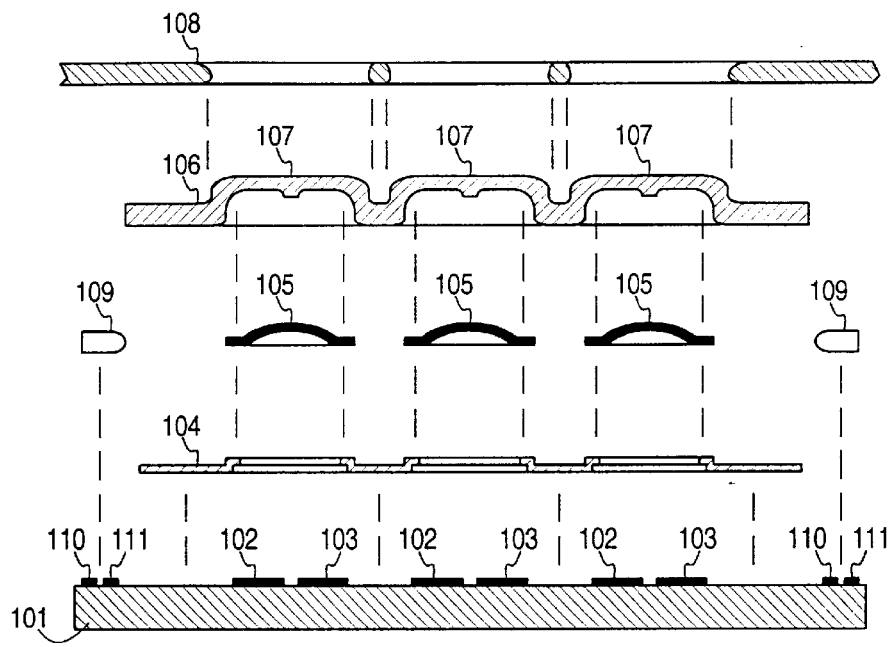
FIG. 1a illustrates a known keypad structure in exploded view.
Figure 1B:
FIG. 1b illustrates the keypad structure of FIG. 1a in assembled configuration.
Figure 1C:
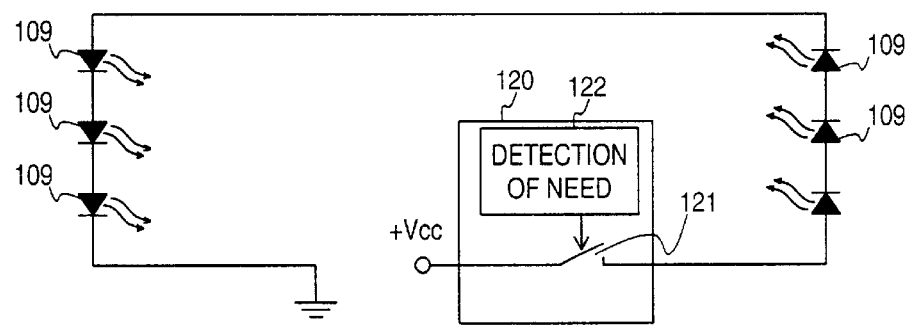
FIG. 1c illustrates certain electric characteristics of the illumination arrangement of the structure of FIGS. 1a and 1b.
Figure 2:
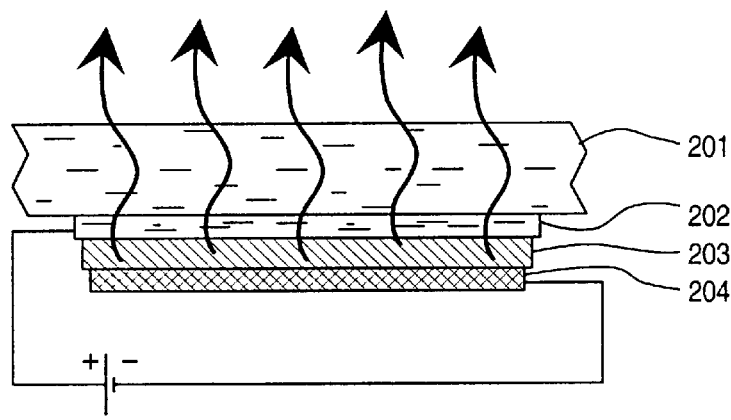
FIG. 2 illustrates a simple layered structure of an OLED.

To provide some additional background to the present invention, a known simple OLED structure is shown in FIG. 2. A transparent or translucent substrate 201 is essentially platy in form and has two parallel planar surfaces. The main function of the substrate layer 201 is to act as a mechanical support structure and to allow light to pass therethrough. One suitable, exemplary substrate material is borosilicate glass. A transparent or translucent ariode layer 202 is located on one of said planar surfaces. In addition to being transparent or translucent to light, the anode layer 202 must be conductive to a certain extent and have a relatively high work function. A suitable material for the anode layer 202 is for example indium tin oxide (ITO). That surface of the anode layer 202 which is not against the substrate 201 is essentially covered by a polymeric recombination layer 203 which is also known as the active layer. It is made of e.g. poly phenylene vinylene (PPV) and is sandwiched between the anode layer 202 and a cathode layer 204 which is made of a conductive material having a relatively low work function, such as aluminium. The OLED structure may comprise additional layers such as protective coatings over the whole stack of anode, active and cathode layers in order to isolate it from the harmful effects of the environment.

When the OLED of FIG. 2 is coupled to a supply voltage so that the anode layer 202 is coupled to a higher potential than the cathode layer 204, it is biased in the forward direction. The difference in work functions between the anode and cathode layers causes holes to be injected from the anode layer into the active layer and electrons to be injected from the cathode layer into the active layer. The movement of charged particles through the active layer means that an electric current flows therethrough. Recombination of holes with electrons within the active layer causes quanta of electromagnetic radiation to be emitted. When the selection of work functions has been made properly, the emitted quanta have a wavelength falling into the range of visible light. The light escaping through the anode layer 202 and the substrate 201 is visually observed. Discrete emissive patterns may be formed most simply by using a stack of continuous substrate, anode and active layers and on top of them a number of discrete cathodes. More elaborate patterned structures may use a number of anodes and a number of cathodes so that for each anode-cathode pair, an emissive pixel or picture element is formed at the point where they overlap.

Figure 3:
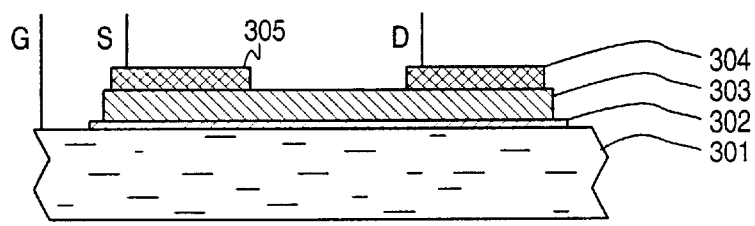
FIG. 3 illustrates a simple layered structure of an OFET.

FIG. 3 illustrates a known structure of an organic FET which can be used as a very thin solid-state switch deposited on a planar surface. The substrate layer 301 is made of degenerated silicon and constitutes the gate of the FET. On one planar surface of the gate is a thin insulating layer 302 the function of which is to electrically insulate the gate from the next layer, which is an organic semiconductor layer 303 that constitutes the channel of the FET. On top of the channel layer 303 there are two conductive electrodes isolated from each other, namely the drain 304 and source 305 of the FET.

Figure 4:
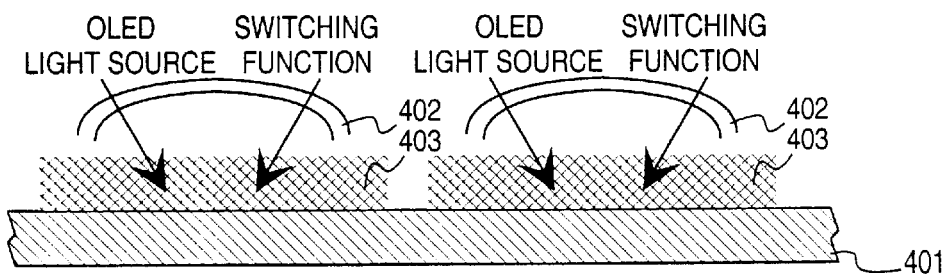
FIG. 4 illustrates the principle of placing both the switching function and the illumination next to each key.

FIG. 4 illustrates, on a rather abstract level, a keypad illumination principle where the illumination function is brought very close to each key. We assume that a certain essentially rigid mechanical support structure 401 is provided for counteracting the mechanical depressing force caused by a user in association with pressing a key 402. The support structure 401 may be for example a printed circuit board located within a keypad-controlled electronic device and held in place by support brackets that constitute a part of the device's overall mechanical structure. The support structure 401 need not be planar. Between each key 402 and the support structure 401 there is a space 403 within which the switching function(s) associated with the key are realized. Space 403 may comprise, for example, the assembly of conductive strips close to each other and an elastically deformable conductive dome next to them. The same space 403 may also comprise an illumination arrangement specific to that key, which illumination arrangement is based on the use of an OLED as the lightemitting component.

Figure 5:
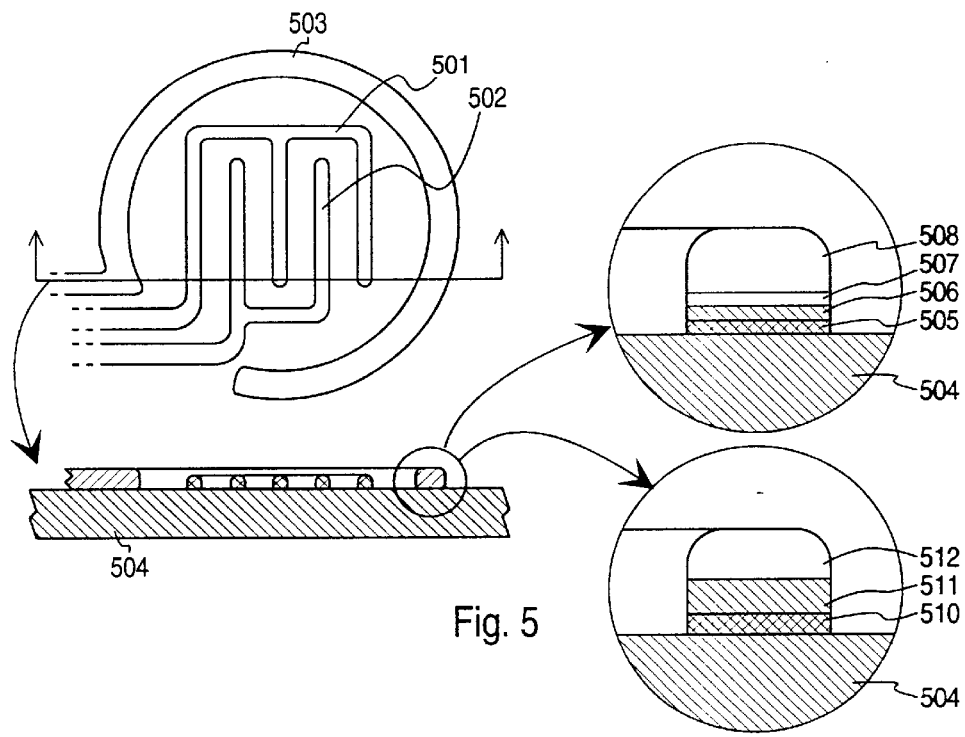
FIG. 5 illustrates an embodiment of the invention where an OLED surrounds the conductive strips used for switching.

The shape of the OLED and its location in relation to the other components of the key structure may vary considerably. FIG. 5 illustrates schematically a solution where the conductive strips 501 and 502, which the conductive dome (not shown in FIG. 5) connects to each other when the key is pressed, are placed in the middle, and a nearly circular OLED element 503 goes round them on the surface of a printed circuit board 504. In the upper alternative enlarged portion of FIG. 5 a cross-section of the OLED element is shown where the cathode layer 505, active layer 506, anode layer 507 and substrate layer 508 are visible with the relative thicknesses of the first three of these greatly exaggerated. In the lower alternative enlarged portion of FIG. 5 the OLED forms an integrated structure with the printed circuit board so that the board material 504 acts as the substrate. Because the board material is not transparent and because the desired direction of emitted light is away from the circuit board (upwards), the layers of the OLED are here in a reverse order with respect to the substrate if compared to that described above: next to the substrate 504 is the cathode layer 510, on top of it the active layer 511 and as the topmost layer the anode layer 512 which is, as stated previously, transparent. The cathode layer 510 may even be made exactly like other conductive pads and traces on the printed circuit board, which further increases the degree of integration. If the conductive dome is at least partly transparent or translucent to light, its diameter can be selected freely in the structure of FIG. 5. However, if the conductive dome is completely opaque, its diameter must be smaller than at least the outer diameter of the OLED element, and most preferably also smaller than the inner diameter of the OLED element, so that the emitted light may pass around the edges of the conductive dome.

Figure 6A:
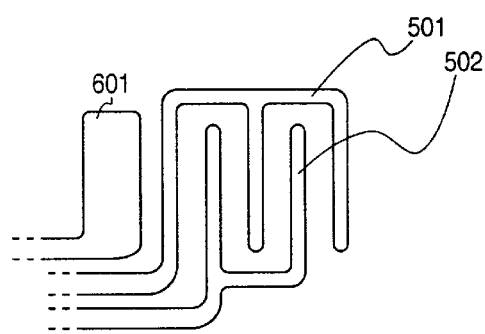
FIGS. 6a, 6b and 6c illustrate some alternative locations of a key-specific OLED.
Figure 6B:
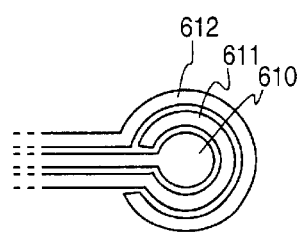
Figure 6C:
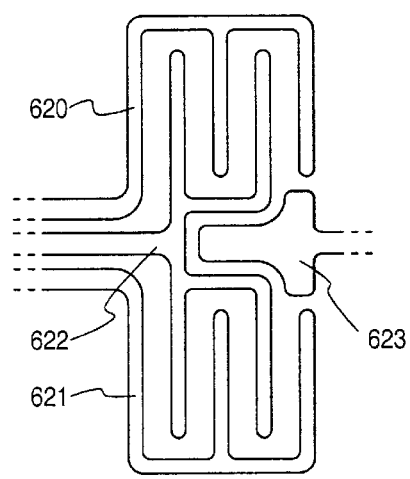

FIGS. 6a, 6b and 6c illustrate schematically some other ways of placing the OLED in the vicinity of the conductive strips which together with the conductive dome constitute the switching parts of a key. In FIG. 6a the conductive strips 501 and 502 are similar as in FIG. 5, but the OLED 601 is only located on one side of them. It would naturally be possible to place several OLEDs like the one shown in FIG. 6a on different sides of the conductive strips and to connect the OLEDs in series or in parallel so that they all provide illumination simultaneously. FIG. 6b shows an arrangement where the OLED 610 is in the middle and the conductive strips 611 and 612 constitute concentric circles around it. In a prior art keypad where the conductive dome is between the OLED and the user, this kind of an arrangement is naturally only possible if the conductive dome (not shown in FIG. 6b) is transparent or translucent or if there is a hole through the conductive dome for the emitted light to shine through. Below we will describe how the invention makes it possible to ease such requirements.

FIG. 6c illustrates an exemplary arrangement of conductive strips for a so-called polydome key where there are more then one conductive dome (not shown in FIG. 6c) under a single key so that the switching function depends on the part or portion of the key which is pressed. More specifically there is a first conductive strip 620, a second conductive strip 621 and a common conductive strip 622. The OLED 623 is here placed partly between the dome areas. The above-mentioned possibilities of either taking a complete OLED and attaching it to the other parts of the structure, or integrating the OLED into the other parts so that at least one of the OLED layers is the same as or similar to the other structural layers, apply regardless of the position, size and shape of the OLED.

Figure 7:
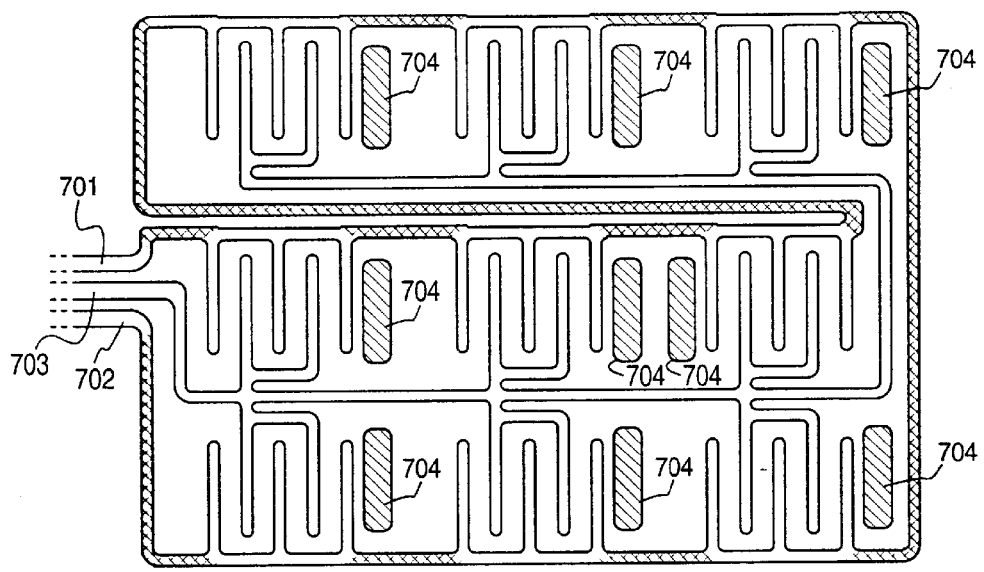
FIG. 7 illustrates a printed circuit board for a resistive keypad with key-specific illumination.

FIG. 7 illustrates the applicability of the invention in association with the concept of a resistive keypad. From the applicant's previous patent application number EP 99660183.7, which is incorporated herein by reference, there is known a functional principle for implementing a keypad so that each key location corresponds to a contact point between an essentially linear resistive element and a conductive element. Especially each key location corresponds to a certain unequivocal pair of distances measured from the ends of the resistive element to the contact point. The input information representing the pressing of a key is generated by measuring the voltages between each end of the resistive element and the contact point and mapping either their absolute values or their ratio into a piece of input information in a lookup table. An advantage of the resistive keypad principle is the small number of connections required between the keypad and the associated processing electronics.

A top view of the printed circuit board of a resistive keypad arrangement is shown in FIG. 7. The electrical connections that are required for the switching functions consist of a first end 701 of the resistive strip, a second end 702 of the resistive strip and a contact point 703 to a common conductive electrode. In order to keep the switching function as reliable as possible, the key locations consist of conductive strip portions in FIG. 7 and the actual resistive material is distributed as relatively short sections between the key locations. Cross-hatching illustrates graphically the resistive portions. With "resistive" we mean that the resistivity of the material is high enough to produce meaningful differences between voltage readings if two adjacent keys are pressed.

The OLEDs 704 are located next to each key location in FIG. 7. The conductive connections that are used to provide a voltage to those OLEDs which should be emitting light are not shown in FIG. 7, but it is within the capability of a person skilled in the art to provide such connections by using, for example, a double sided or multilayer printed circuit board.

Figure 8:
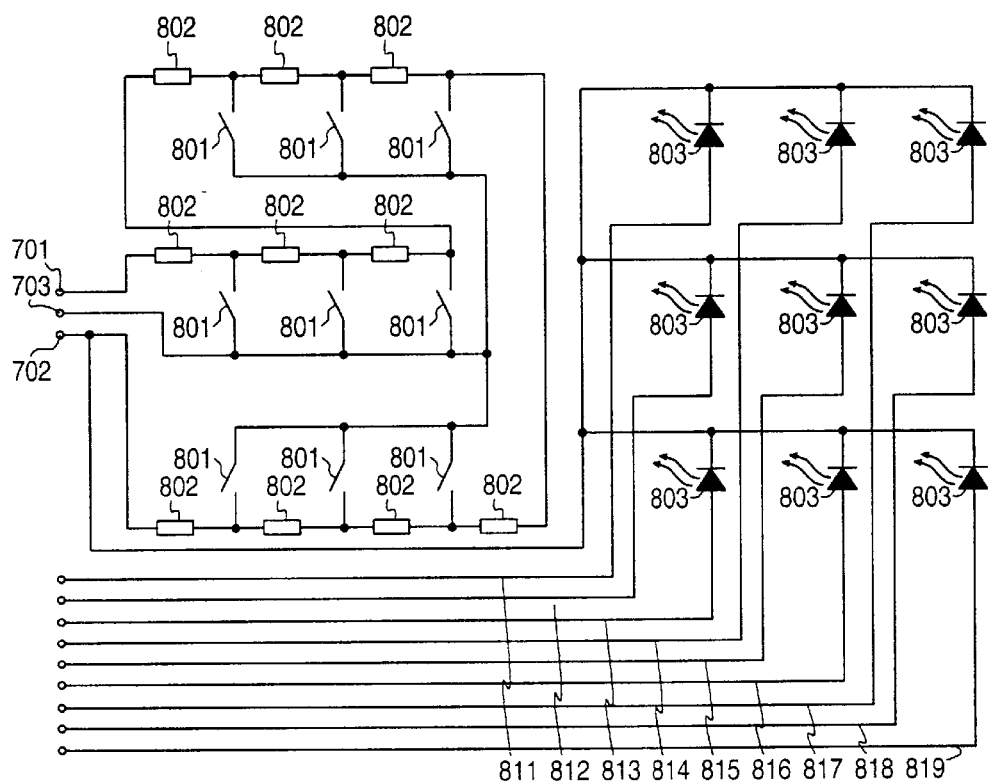
FIG. 8 illustrates a simple circuit diagram for an illuminated keypad.

FIG. 8 is one possible circuit diagram for an illuminated keypad structure the layout of which follows the model of FIG. 7. Each key location is represented in FIG. 8 as a switch 801, and the distributed resistive sections between key locations that together constitute a resistive path from the first end 701 to the second end 702 appear as resistors 802. Here we assume that the second end 702 is coupled to the local ground potential. Each OLED appears in FIG. 8 as a light-emitting diode 803. Note that the physical locations of the graphical symbols in a circuit diagram need not correspond to the actual relative physical locations of the corresponding components. In the simple embodiment of FIG. 8 there is a separate supply voltage line 811 to 819 to the anode of each OLED, and all cathodes are coupled to ground through the second end connection 702 of the resistive strip.

Figure 9:
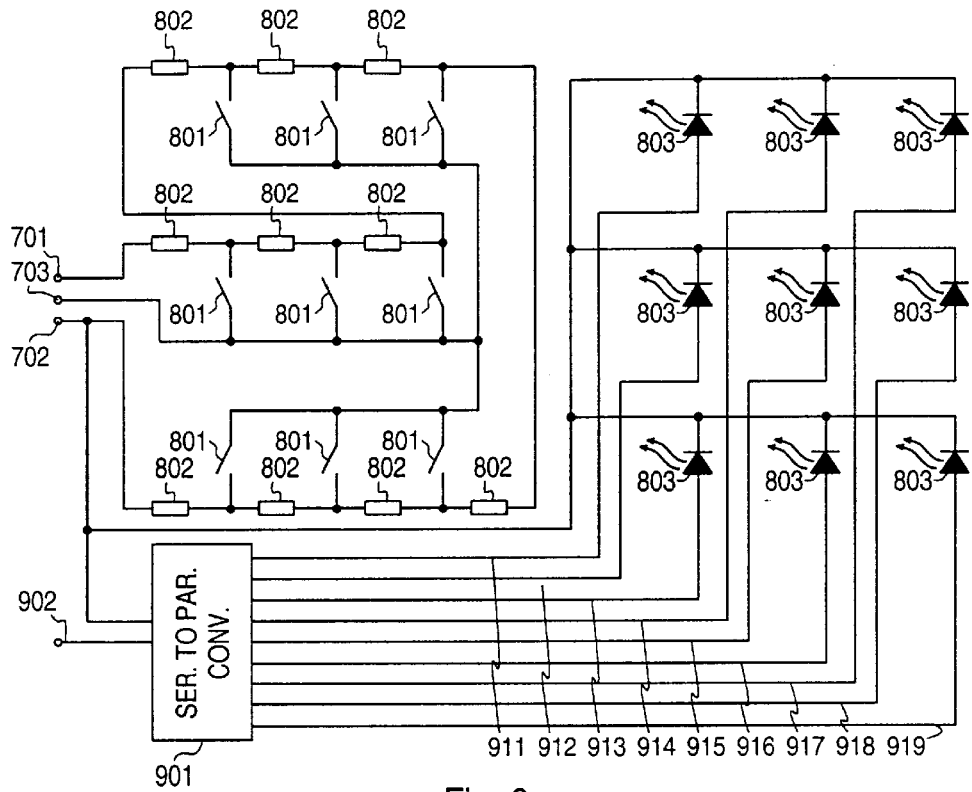
FIG. 9 illustrates a variation of the circuit diagram of FIG. 8.

The disadvantage of the embodiment of FIG. 8 is the large number of connections needed to separately switch on or off the OLEDs. FIG. 9 comprises, as an addition to the circuit diagram of FIG. 8, a serial to parallel converter 901 which takes input signals over a serial line 902 and converts them to certain preprogrammed illumination patterns which are implemented by providing supply voltages to selected OLEDs through lines 911 to 919. The serial to parallel converter 901 is in its simplest embodiment a linear shift register into which a sequence of bits is serially written and from which at least a part of the bits of the sequence may be simultaneously read in a parallel fashion. It may also comprise e.g. progrannable logic.

Figure 10:
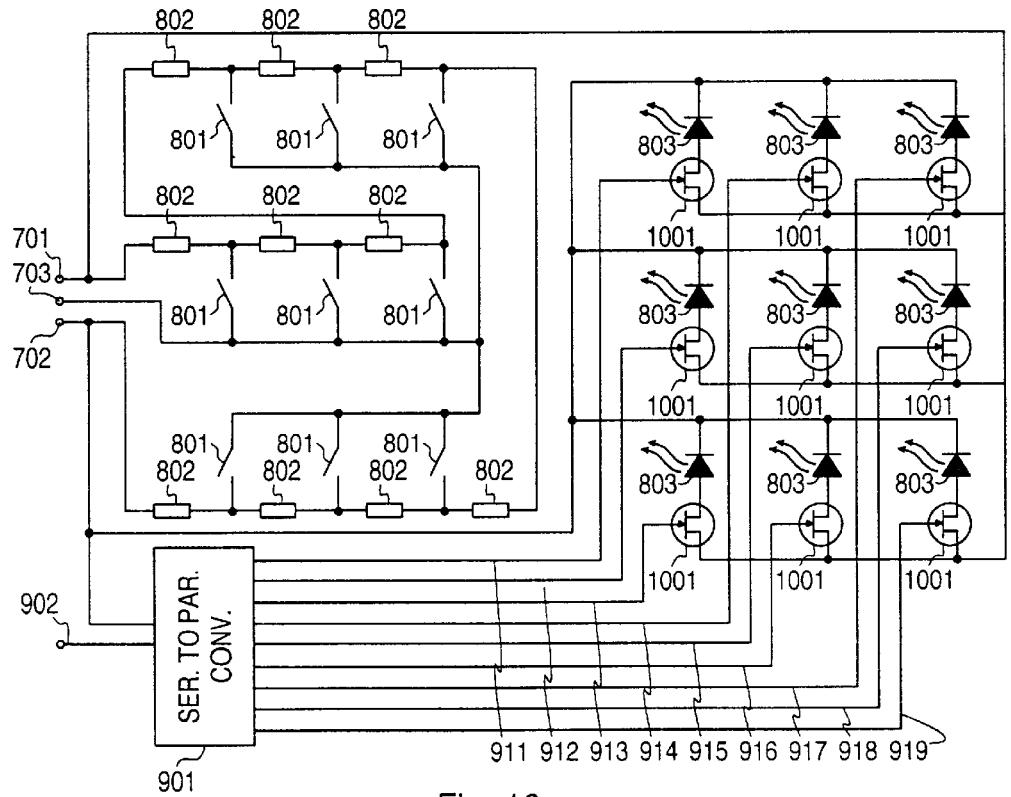
FIG. 10 illustrates a further variation of the circuit diagram of FIG. 8.

Even the embodiment of FIG. 9 comprises the disadvantage that a relatively high current must be taken from each parallel output of the serial to parallel converter 901 in order to make the OLEDs emit enough light. FIG. 10 illustrates an arrangement where each OLED 803 is accompanied by a semiconductor switching component 1001, such as a field-effect transistor. Each serially coupled OLED-transistor pair constitutes a controllable light-emitting entity of which there are a certain number (nine in FIG. 10) coupled in parallel between a pair of supply voltage electrodes. In FIG. 10 these supply voltage electrodes are the same as the first 701 and second 702 ends of the resistive strip. The gate electrode of the FET constitutes the control input of the controllable light-emitting entity. The control inputs are coupled to the outputs of the serial to parallel converter 901 so that the practical operation of the circuit is the same as of that illustrated in FIG. 9, with the exception that now the serial to parallel converter 901 needs to supply only a very low current to each input.

The invention does not limit the selection of semiconductor switching components in the arrangement of FIG. 10, but specific advantages can be gained through the use of OFETs. Previously we have noted that the thickness of the keypad arrangement should most advantageously be minimized, which makes the use of OLEDs as light sources particularly advantageous since they can be made very thin. Additionally the OLEDs consist of layers which can even be produced together with the other layers of the keypad structure, resulting in a highly integrated structural solution with little or no soldering required. OFETs share the same advantages.

If conveying illumination commands to the keypad arrangement (including the serial to parallel converter) is too slow or otherwise impossible, one may use a parallal to parallel mapping circuit in place of the serial to parallel converter 901. There could be for example four parallel input lines to the mapping circuit and nine (or as many as there are independent light sources) output lines therefrom. With four parallel input lines it is possible to give 16 different illumination commands. Although not all possible permutations of activated OLEDs are thereby possible to produce, 16 different illumination patterns is still a remarkable improvement over the "completely on/completely off" type prior art illumination solutions.

In the foregoing we have implicitly assumed that the OLEDs (and possible accompanying OFETs) are to appear on the surface of printed circuit board. This is advantageous, since the required electrical connections are easily implemented within the printed circuit board, and the manufacturing process of the printed circuit board involves in any case the controlled deposition of patterned layers on the surface(s) thereof, which makes it easy to integrate also the production of the OLED (and OFET) layers to the manufacturing process. However, if a conventional solution with conductive domes or even a continuous conductive dome sheet is used, there remains the problem of arranging for the conduction of light to the other side of the domes or the dome sheet.

It is possible to place the OLEDs (and OFETs) also between the domes (or the dome sheet) and the outer structural components, i.e. on the top side of the dome layer instead of under it. The dome sheet, the key mat or even the outer cover of the electric apparatus may act as the support structure for the OLEDs (and OFETs). All these alternatives involve the further selection of either attaching complete OLEDs (and OFETS) to the other structural component(s) or using the other structural component(s) as integral parts of the OLED (and OFET) structure. The latter alternative allows for example the OLEDs to be produced in a printing process which uses litographic methods or silk screen printing to deposit the patterned layer structures needed.

Figure 11:
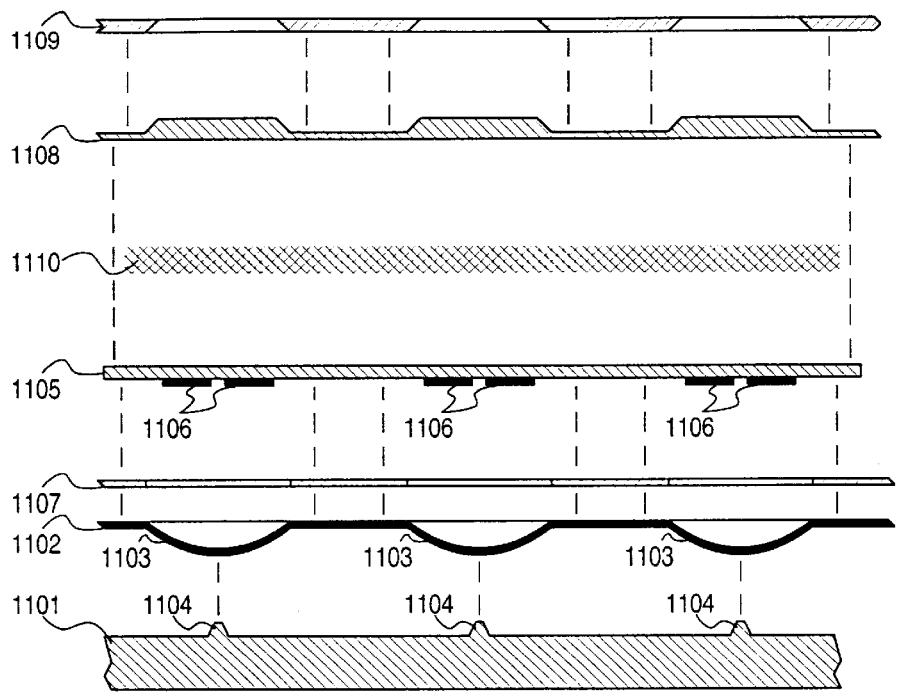
FIG. 11 illustrates an alternative structural principle for a layered keypad.

FIG. 11 illustrates a structural principle for a keypad which is completely new compared to all solutions described above. The structure is shown in exploded view in order to give a better view of its components. Within a certain electronic device there is an essentially rigid mechanical support structure 1101. On top of it there is a dome sheet 1102 comprising a number of conductive domes 1103. The dome sheet 1102 is made of an elastically deformable material and thus it resembles the known dome sheets used in keypad arrangements. However, the dome sheet 1102 is oriented so that the domes bulge downwards from it, i.e. into the direction of the support structure 1101 and not upwards towards the direction from which the user will press the keys. Small protrusions 1104 may be provided on the surface of the support structure 1101 to ensure a point-like contact between the support structure 1101 and each dome 1103 in the dome sheet 1102. A point-like contact to a dome is known to enhance the tactile feel experienced by the user in pressing the key associated with the dome.

On top of the dome sheet 1102 there is a printed circuit board 1105 which is thin enough to be flexible to a certain extent. It can be made of e.g. the known flexible printed circuit materials, also known as flex boards or just flexes. If the concept of resistive keyboard is used, the printed circuit board 1105 may be made of a polymer foil (e.g. polyester) onto which the resistive keyboard circuitry is printed; OLEDs or similar layered light sources may be integrated into such a polymer foil. In FIG. 11 the printed circuit board 1105 comprises, on that surface thereof which comes against the dome sheet 1102, conductive strips 1106 at locations which correspond to the locations of the domes 1103. In order to provide electric isolation between the dome sheet 1101 and those parts of the printed circuit board 1105 which should not come into conductive contact with the dome sheet, a perforated insulation sheet 1107 may be used between the dome sheet 1102 and the printed circuit board 1105.

On the upper side of the printed circuit board 1105 there is an elastic key mat 1108, which may further be covered with a perforated outer cover 1109 if necessary. The key mat 1108 is transparent or translucent to light and may comprise bulging protrusions to mark the places of the keys, but the latter is not necessary. The transparency of the key mat need not be total, as it suffices that at least some key locations contain transparent or translucent areas, which may have e.g. the shape of numbers or alphabetical characters. Illumination of the keys is built into the space 1110 which is left between the printed circuit board 1105 and the elastic key mat 1108. A continuous key mat could be replaced or complemented with a number of smaller submats or even with a number of individual key surfaces.

Figure 12:
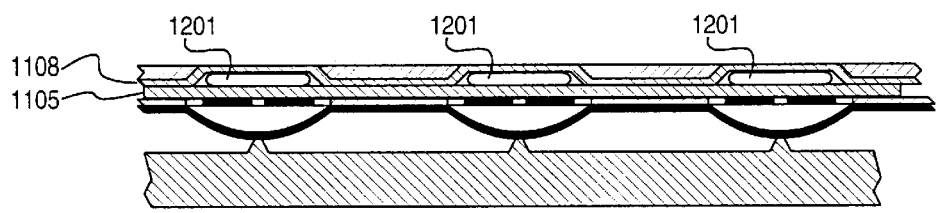
FIG. 12 illustrates the application of the principle of FIG. 11 to OLED illumination.

FIG. 12 illustrates the combination of the key-specific OLED illumination principle to the layered structure shown schematically in FIG. 11. The layers in the keypad structure of FIG. 12 are the same as in FIG. 11, but they are now shown in assembled configuration. Between the upper surface of the printed circuit board 1105 and the elastic key mat 1108 there are a number of OLEDs 1201 so that each OLED is placed directly under a key of its own. The electric connections needed for the OLEDs 1201 can utilize the printed circuit board 1105 as their support structure. The OLEDs 1201 can even be manufactured as integral parts of the printed circuit board 1105, for example by printing them on the surface of the printed circuit board, as was described earlier in association with the other embodiments of the invention. Alternatively the OLEDs 1201 may be attached to the elastic key mat 1108, in which case they need to comprise (or to be coupled to) exposed contact surfaces on that side of the OLEDs which comes against the printed circuit board. The OLEDs can even be embedded in the substance of either the printed circuit board or the key mat. The principal direction of emitted light from the OLEDs is upwards, through the keys.

Figure 13:
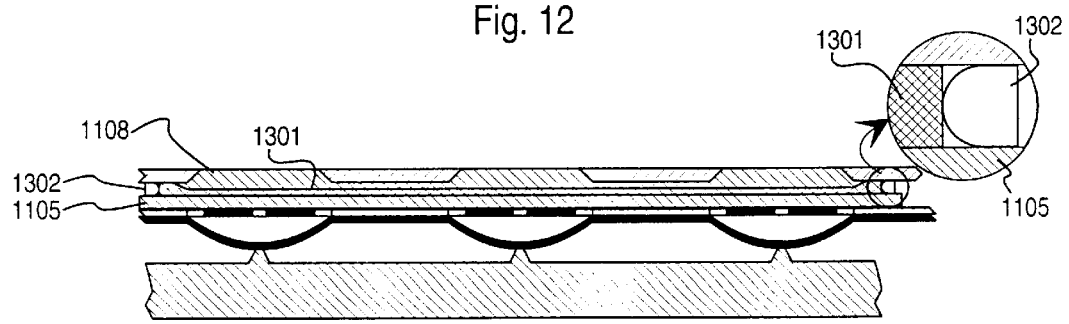
FIG. 13 illustrates the application of the principle of FIG. 11 to SM-LED illumination and FIG. 14 illustrates a method for using the illumination of a keypad.

FIG. 13 shows how the structural principle shown in FIG. 11 can be used to revolutionize the keypad illumination even when more conventional light sources are otherwise used. In the structure of FIG. 13 there is a relatively thin light guide layer 1301 between the printed circuit board 1105 and the key mat 1108; instead of using a separate light guide layer one could also use the key mat 1108 as the light-guiding element. Surface-mounted LEDs 1302 are placed on the upper surface of the printed circuit board 1105 so that when switched on, they emit light into the light guide.

The structural principle of FIG. 11, some more practical embodiments of which are shown in FIGS. 12 and 13, allows the light sources of the illumination arrangement to be placed so that the passage of light from the light source to the point where it escapes the keypad structure and goes into the direction of the user's eye can be made very short and very easy for the light to travel through. This fact can be utilized by at least two ways. Either we may use the same amount of electrical power as in prior art arrangements to run the illumination arrangement, in which case the amount of light reaching the user's eye can be made larger than before. Or we may aim at generating the same observable amount of light, in which case much less electrical power is needed.

In the foregoing we have not considered in detail, how should the flexible illumination possibilities brought forward by the invention be used. The purpose of prior art keypad illumination arrangements has been solely to enable the user to see the location and/or the identifying characters of the keys also when ambient light is not sufficiently bright. This is understandable, since the prior art illumination arrangements did not produce a very high level of illumination, and the illumination of single keys or key groups was not possible. However, according to the invention, single keys or key groups that constitute only a part of the whole keypad can be separately illuminated. Additionally, placing the light sources in an advantageous way as described earlier allows the amount of observable light to be raised so that illumination effects can be visible also despite of relatively bright ambient lighting.

Figure 14:
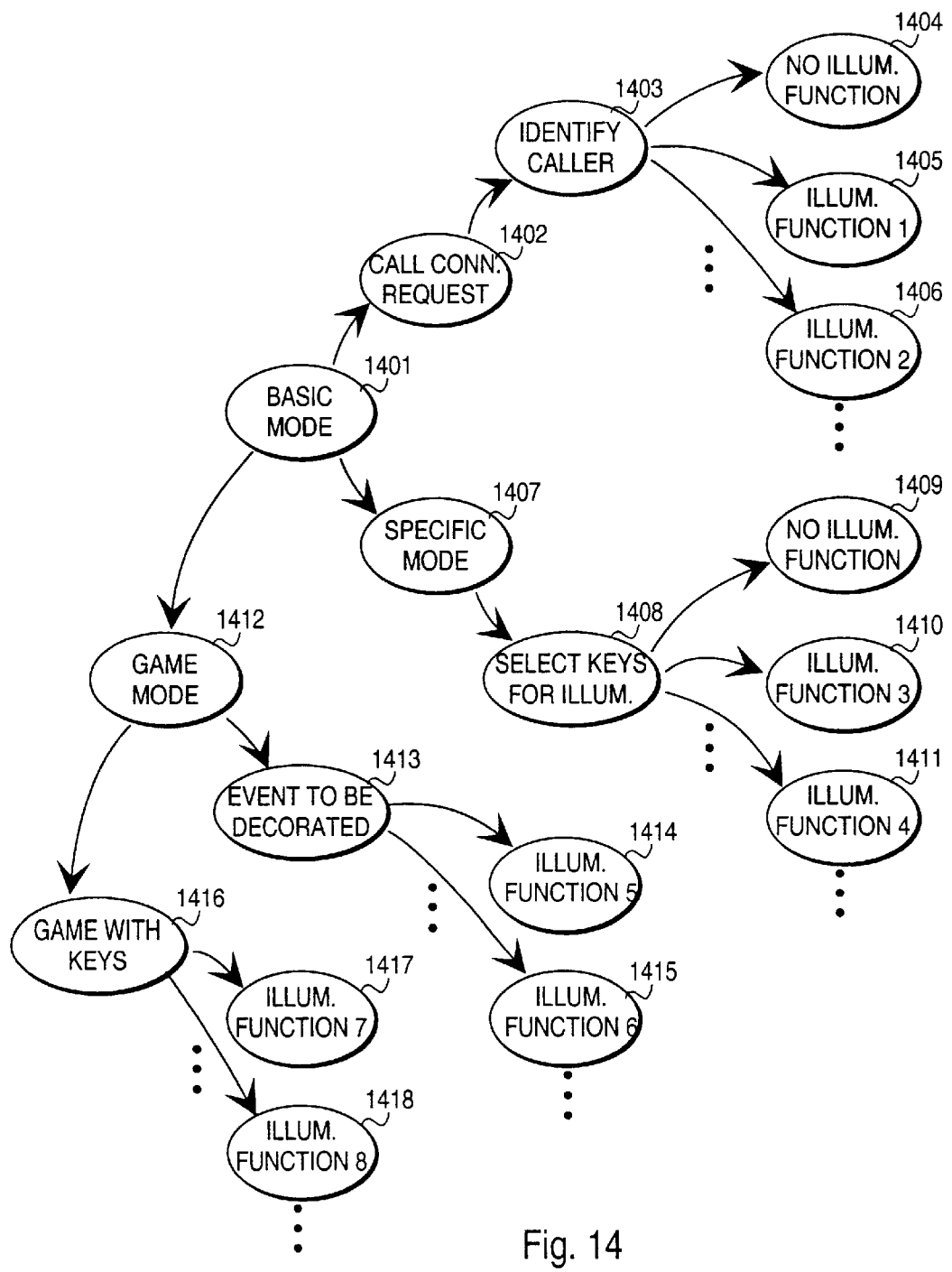

From known mobile telephones it is known to make the mobile telephone identify a caller and to select a different ringing tone according to the identity of the caller. For example, the telephone can ba programmed to announce calls from a certain very specific caller with a unique ringing tone, or the potential callers may be divided into caller groups so that each group is associated with a ringing tone of its own. The key or key group specific illumination arrangement according to the invention may be used in similar fashion. FIG. 14 is a state diagram where state 1401 corresponds to the basic operational mode of a mobile telephone when it has been switched on but it is idle. During a programming procedure at least one caller identity has been associated with a certain illumination pattern or a certain sequence of illumination patterns. When a call connection request is received according to state 1402, the telephone tries to identify the caller at state 1403. Depending on what illumination pattern or pattern sequence, if any, has been associated with the caller which is identified, either no illumination effect is selected as in state 1404 or a certain illumination pattern or patterns are used in place of or as a complement to the acoustic ringing tone as in states 1405 and 1406. Using a sequence of illumination patterns fast enough creates the impression of animation: the keypad illumination plays a simple "movie" to the user.

In many cases the user of a keypad-controlled electronic device may be in doubt regarding which key should be pressed next. The key-specific illumination arrangement according to the invention may be used for user guidance. State 1407 represents a certain situation where there is a most probable or only possible key which the user should press next. At state 1408 that key or those keys are identified, and at one of states 1409, 1410 or 1411 it can be marked by illuminating it while the other keys are not illuminated, by illuminating it with higher lighting intensity than the other keys, by flashing its illumination or by producing some other illumination effect. Also if in a certain situation only a limited part of a whole keypad is "active" or available for use, this can be emphasized by illuminating only that part of the keypad.

The illumination effects can also be used for recreational purposes. Games are already integrated into the mobile telephones known at the priority date of the present patent application, so illumination of specific keys or key groups can be made a part of the game. State 1412 represents a game mode. The first assumption is that the illumination serves a decorative and illustrative purpose. State 1413 represents the occurrence of a high score or other achievement in the game which is then rewarded at one of states 1414 or 1415 with animated and/or flashing illumination of some kind. Another assumption is that the illumination is made an integral part of playing a game which is played by pressing the keys according to state 1416. An example of the latter category is a game which tests the user's memory and reflexes so that a sequence of keys is illuminated in succession, and the user must press the same keys in the same order as long as he can. The illumination functions associated with such games are represented in FIG. 14 by states 1417 and 1418.

If we assume that the controlling of the illumination patterns is based on the use of a serial to parallel converter as in FIGS. 9 and 10, there are two basic approaches to the task of generating illumination sequences. The most simple one of them in terms of the structural and functional complexity of the serial to parallel converter is that each command given by the microprocessor through the serial connection to the serial to parallel converter represents exactly one illumination pattern. In order to realize an animation effect, which is a sequence of successive illumination patterns, the microprocessor sends successive commands to the serial to parallel converters. The other alternative is that a single command means a complete sequence of illumination patterns. According to the latter approach, when the serial to parallel converter receives a command from the microprocessor through the serial connection, it checks whether the command means a single pattern or a sequence. If it means a sequence, it reads the patterns constituting the sequence from a memory and gives the control signals to the light sources (or light source+switch entities) so that the patterns are produced one at a time. The pace of changing from one pattern to another in the sequence needs to be determined in relation to a certain clocking signal. The serial to parallel converter may have a clock signal generator of its own to produce the clock signal, or it may receive a clock signal from some other parts of the electronic device.

Regardless of whether the illumination is provided in the form of a single pattern or a sequence, there must be defined the duration for which the illumination is on. Also for this purpose we may define either that the illumination is on for the same duration for which the command from the microprocessor to the serial to parallel converter is on, or that the serial to parallel converter comprises means for implementing a time constant so that after having received a command from the microprocessor it keeps the illumination effect meant by the command on until a time equal to the time constant has passed from the moment of receiving the command. According to still another approach the serial to parallel converter fulfils each command immediately and makes changes only after having received the next command, and a specific command has been defined as the "switch off" command.

In the foregoing we have described mostly OLEDs as the light sources which are made of layered foil structures and which are used for key- or key group specific illumination. This is a consequence of a fact thet OLEDs are the most important category of light sources made of layered foil structures known at the priority date of the present patent application. However, it should be noted that the invention is by no means limited to the use of OLEDs, and indeed the basic structural principle of the invention does not require the keypad to have illumination at all.

The above-described exemplary embodiments of the invention should be construed as aids for comprehending the applicability of the claims and not as explicit limitations regarding such applicability. The features recited in depending claims are freely combinable unless explicitly otherwise stated. Directional expressions such as "upper surface" or "on top of" refer only to the directions illustrated in the drawings and do not limit the applicability of the invention to structures only oriented in a certain direction. The verb "to comprise" is used as an open limitation that does not exclude the inclusion of other, unrecited features.

What is claimed is:

1. A keypad for a portable electronic device, comprising:
   an outer surface,
   an elastic key mat having a number of pressable keys,
   associated with each key, a pair of conductive contact points separated from each other and
   a dome sheet including a plurality of elastic domes, each next to individual pairs of the conductive contact points; and
   a flexible printed circuit material between the dome sheet and the elastic key mat, the flexile printed circuit material including the conductive contact points;
   wherein for each pair of conductive contact points there is an adjacent elastic dome having a concave side and convex side, of which the concave side is at least partially conductive and directed towards the pair of conductive contact points and towards the outer surface of the keypad.

2. A keypad according to claim 1, comprising:
   in respect of each key, a pair of conductive patterns close to each other, said pair of conductive patterns together forming a key location,
   a number of resistive strip sections that link conductive patterns from a number of key locations into a resistive chain having a first end and second end, and
   a number of light sources, each of which is coupled to the second end of said resistive chain so that the second end of said resistive chain functions as a common coupling point to said light sources.

3. A keypad according to claim 1, comprising as illumination means a light source in the immediate vicinity of the pair of conductive contact points associated with each key.

4. A keypad according to claim 1, comprising, in the following order, the following essentially parallel layers:
   a mechanical support structure,
   the dome sheet wherein each dome is bulging and elastically deformable with respect of each key, and the bulging direction of each dome is towards said mechanical support structure,
   a printed circuit board that comprises conductive patterns on that surface of said printed circuit board which is towards said dome layer, and
   a key layer comprising a visible and touchable surface in respect of each key.

5. A keypad according to claim 4, additionally comprising a perforated insulation layer between said dome layer and said printed circuit board, and an outer cover on the distant side of said key layer.

6. A keypad according to claim 4, comprising:
   a light guide between said printed circuit board and said key layer and
   at least one light source for emitting light into said light guide.

7. A keypad according to claim 4, comprising, in respect of each elastic dome, a protrusion in said mechanical support structure for providing for a mechanical contact into each elastic dome through an area that is remarkably smaller than the area of an elastic dome.

8. A keypad according to claim 4, additionally comprising light sources located between said printed circuit board and said key layer for providing illumination to the keypad.

9. A keypad according to claim 8, wherein said light sources are semiconductor lightemitting devices made of layered foil structures.

10. A keypad according to claim 9, wherein said printed circuit board constitutes a supporting substrate layer for the semiconductor lightemitting devices made of layered foil structures.

11. A keypad for a portable electronic device, comprising:
   a rigid mechanical support structure having a plurality of protrusions;
   an elastically deformable dome sheet having a first side and a second side, and including a plurality of conductive domes oriented to bulge away from the second side toward the support structure, such that each of the plurality of protrusions provides a point contact between the support structure and each of the plurality of domes;
   a flexible printed circuit foil having conductive strips at locations corresponding to locations of the plurality of domes on a surface of the foil contacting the first side of the dome sheet;
   an elastic key mat adjacent to a surface of the foil that does not contact the first side of the dome sheet; and
   an illumination device positioned in a space between the elastic key mat and the foil.

12. The keypad of claim 11, wherein the illumination device includes one or more organic LED's.

13. The keypad of claim 11, wherein the illumination device includes a light guide and one or more light sources mounted on the foil.

* * * * *